(12) United States Patent
Wang et al.

(10) Patent No.: US 8,955,310 B2
(45) Date of Patent: Feb. 17, 2015

(54) ADAPTIVE REGENERATION OF AN EXHAUST AFTERTREATMENT DEVICE IN RESPONSE TO A BIODIESEL FUEL BLEND

(75) Inventors: Yue-Yun Wang, Troy, MI (US); Ibrahim Haskara, Macomb, MI (US); Claudio Ciaravino, Turin (IT); Alberto Vassallo, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 170 days.

(21) Appl. No.: 13/466,204

(22) Filed: May 8, 2012

(65) Prior Publication Data

US 2013/0298526 A1 Nov. 14, 2013

(51) Int. Cl.
 *F01N 3/00* (2006.01)
 *F01N 3/02* (2006.01)
 *F01N 3/10* (2006.01)
 *F01N 3/20* (2006.01)

(52) U.S. Cl.
 USPC .............. 60/295; 60/286; 60/297; 60/299; 60/311

(58) Field of Classification Search
 USPC .................. 60/286, 295, 297, 299, 311
 See application file for complete search history.

(56) References Cited

U.S. PATENT DOCUMENTS

| | | | |
|---|---|---|---|
| 4,944,652 A | 7/1990 | Blotenberg | |
| 7,089,738 B1 | 8/2006 | Boewe et al. | |
| 7,360,525 B2 | 4/2008 | Yamaguchi et al. | |
| 8,087,870 B2 | 1/2012 | Flucker et al. | |
| 2009/0173061 A1* | 7/2009 | Vitse et al. | 60/287 |
| 2010/0043397 A1 | 2/2010 | Wang et al. | |
| 2010/0083640 A1 | 4/2010 | Wang et al. | |
| 2010/0175370 A1* | 7/2010 | Bunge | 60/277 |
| 2011/0166767 A1* | 7/2011 | Kurtz et al. | 701/103 |
| 2011/0208409 A1 | 8/2011 | Snyder et al. | |

OTHER PUBLICATIONS

Guido, C., et al; Alternative Diesel Fuels Effects on Combustion and Emissions of an Euro5 Automotive Diesel Engine; SAE 2010-01-0472; SAE, Warrendale, PA, USA.
U.S. Appl. No. 13/114,004, Not publ., Wang, et al.
U.S. Appl. No. 13/113,177, Not publ., Wang, et al.
U.S. Appl. No. 12/850,112, Not publ., Haskara, et al.

* cited by examiner

*Primary Examiner* — Audrey K Bradley
*Assistant Examiner* — Dapinder Singh (57) ABSTRACT

A compression-ignition engine is coupled to an exhaust aftertreatment system including a particulate filter. A method of operating the compression-ignition engine includes executing a feed-forward control scheme to determine an amount of post-combustion fuel to achieve a preferred temperature in the exhaust gas feedstream at an inlet to the particulate filter. The amount of post-combustion fuel is a nominal post-combustion fuel amount adjusted for a biodiesel blend ratio of the fuel. The post-combustion fuel is injected upstream of the exhaust aftertreatment system in response to a command to regenerate the particulate filter.

10 Claims, 5 Drawing Sheets

ADAPTIVE REGENERATION OF AN EXHAUST AFTERTREATMENT DEVICE IN RESPONSE TO A BIODIESEL FUEL BLEND

TECHNICAL FIELD

This disclosure is related to an internal combustion engine configured to use a biodiesel fuel blend, including operation of the engine to regenerate an exhaust aftertreatment device.

BACKGROUND

The statements in this section merely provide background information related to the present disclosure. Accordingly, such statements are not intended to constitute an admission of prior art.

Known internal combustion engines may be configured to operate with compression-ignition (CI) combustion, and are often referred to as diesel or CI engines. CI engines employ fuel that may be derived from petroleum or vegetable oil and animal fat stocks. Fuel derived from petroleum includes long-chain hydrocarbon molecules and is referred herein as diesel fuel. Fuel derived from vegetable oil or animal fat stocks includes long-chain alkyl esters and is referred to herein as biodiesel fuel or biofuel. CI engines can operate on a 100% diesel fuel. Additionally, CI engines can be configured to operate partially or fully on a biodiesel fuel. A biodiesel blend ratio can be identified. By way of example, 0% BV fuel is identified as a 100% diesel fuel, and 100% BV fuel is identified as 100% biodiesel fuel. xx % BV fuel can be identified as a fuel composition including x % biodiesel fuel and (100%−x %) diesel fuel. For example, 40% BV fuel has a fuel composition including 40% biodiesel fuel and 60% diesel fuel. Diesel fuel and biodiesel fuel have different physical and chemical properties. Diesel fuel has a higher energy density than biodiesel fuel, whereas biodiesel fuel has higher oxygen content than diesel fuel. As a result, a greater mass of biodiesel fuel must be injected than of diesel fuel under the same circumstances in order to achieve similar combustion characteristics. Injected fuel mass for combustion can be adjusted in response to the biodiesel blend ratio. Further, when fuel is used for purposes other than combustion within the engine, injected fuel mass must be adjusted based upon the biodiesel blend ratio. CI engines generate particulate matter (PM), or soot during combustion. Exhaust aftertreatment systems of CI engines employ particulate filters to remove PM from the exhaust gas feedstream. Known particulate filters have a finite PM storage capacity and require regular purging including high temperature operation to avoid increased flow restriction in the exhaust system with corresponding reduced engine output power.

SUMMARY

A compression-ignition engine is coupled to an exhaust aftertreatment system including a particulate filter. A method of operating the compression-ignition engine includes executing a feed-forward control scheme to determine an amount of post-combustion fuel to achieve a preferred temperature in the exhaust gas feedstream at an inlet to the particulate filter. The amount of post-combustion fuel is a nominal post-combustion fuel amount adjusted for a biodiesel blend ratio of the fuel. The post-combustion fuel is injected upstream of the exhaust aftertreatment system in response to a command to regenerate the particulate filter.

BRIEF DESCRIPTION OF THE DRAWINGS

One or more embodiments will now be described, by way of example, with reference to the accompanying drawings, in which:

FIG. 3-1 illustrates exhaust emissions data associated with operating an exemplary CI engine combusting fuel including different biodiesel blend ratios at several engine operating points, with the exhaust emissions data including particulate matter (PM) (mg/km), in accordance with the disclosure;

FIG. 3-2 illustrates exemplary data for derivation of a PM generation scaling factor for biodiesel blend ratios ranging from 0% BV fuel to 100% BV fuel, in accordance with the disclosure;

DETAILED DESCRIPTION

Figure 1:
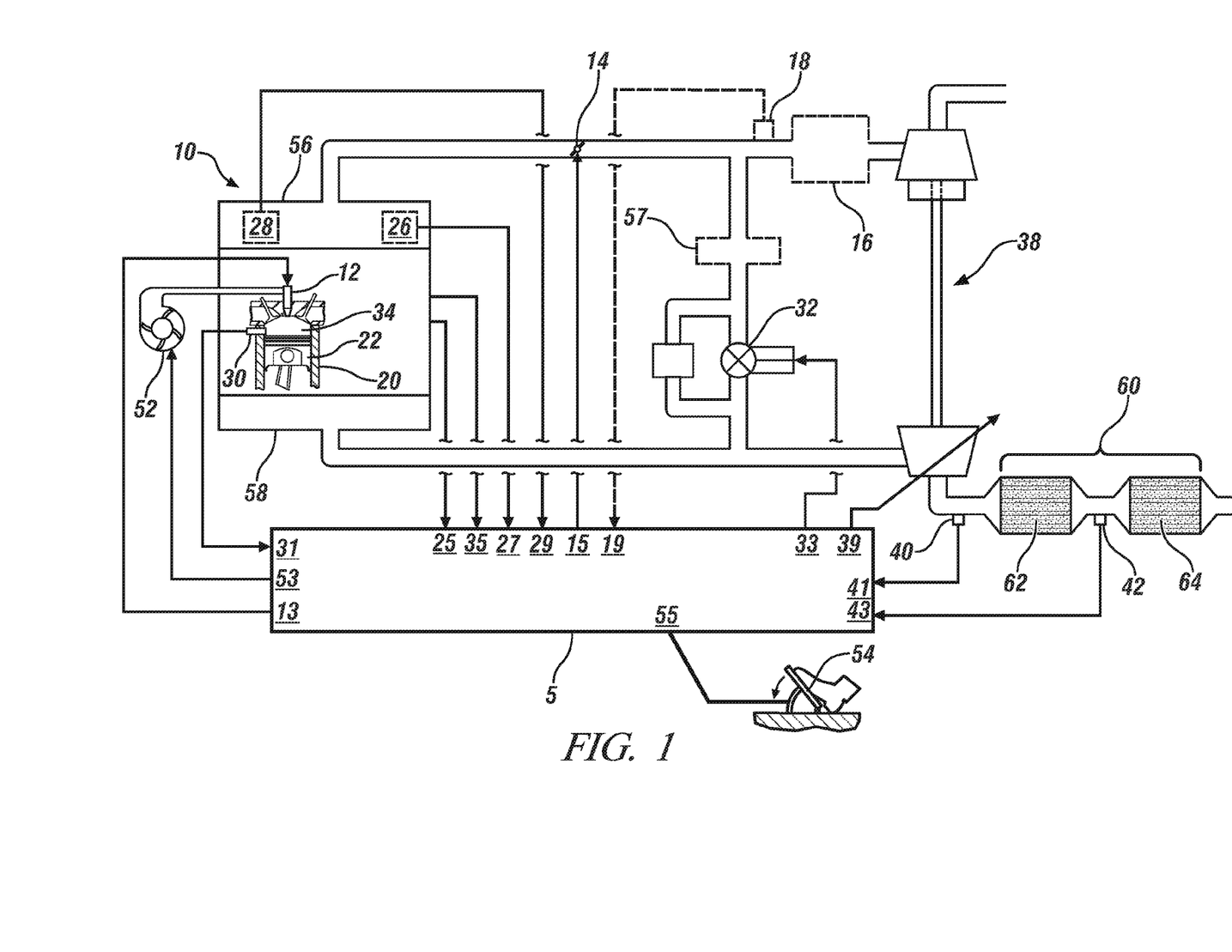
FIG. 1 illustrates an exemplary CI engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 60. The exemplary CI engine 10 is a multi-cylinder, direct-injection, compression-ignition (CI) internal combustion engine including an intake manifold 56 and an exhaust manifold 58, and having reciprocating pistons 22 attached to a crankshaft and movable in cylinders 20 which define variable volume combustion chambers 34. The crankshaft may be attached to a vehicle transmission and driveline to deliver tractive torque thereto in response to an output torque request. The CI engine 10 preferably employs a four-stroke operation wherein each engine combustion cycle includes 720° of angular rotation of the crankshaft divided into four 180° stages of reciprocating movement of the piston 22 in the engine cylinder 20. Each variable volume combustion chamber 34 is defined between the piston 22, the cylinder 20, and a cylinder head as the piston 22 translates in the cylinder 20 between top-dead-center and bottom-dead-center points. The cylinder head includes intake valves and exhaust valves. The CI engine 10 preferably operates in a four-stroke combustion cycle that includes intake, compression, expansion, and exhaust strokes. It is appreciated that the concepts described herein apply to other combustion cycles. The CI engine 10 preferably operates at a lean air/fuel ratio. The exhaust aftertreatment system 60 fluidly couples to the exhaust manifold 58, and preferably includes an oxidation catalyst 62 fluidly upstream of a particulate filter 64. The particulate filter 64 may be catalyzed. The exhaust aftertreatment system 60 may include other components and sensors. The disclosure is applicable to other engine configurations that employ some form of biofuel including engine configurations that operate at lean conditions and generate particulate matter, including lean-burn spark-ignition engines. The disclosure is applicable to powertrain systems that employ internal combustion engines in combination with transmission devices to generate tractive torque, including by way of example engine-transmission systems and hybrid powertrain systems employing non-combustion torque generative devices (i.e. motors/generators).

The CI engine 10 includes sensors to monitor engine operation and actuators which control engine operation. The sensors and actuators are signally and operatively connected to control module 5. Output and control signals associated with the sensors and actuators are collectively referred to herein as engine operating parameters 105. The actuators are installed on the CI engine 10 and controlled by the control module 5 in response to operator inputs to achieve various performance goals. A fuel injection system including a plurality of direct-injection fuel injectors 12 is fluidly coupled either directly or via a common-rail fuel distribution system to a pressurized fuel distribution system including a high-pressure fuel pump 52. The fuel pump 52 may be controlled to control fuel pressure 53. The fuel injectors 12 directly inject fuel into each of the combustion chambers 34 to form a cylinder charge in response to an injector control signal 13 from the control module 5. The injector control signal 13 is generated in response to the output torque request, and correlates to an amount of fuel to deliver to the combustion chamber 34. The fuel injectors 12 are individually supplied with pressurized fuel, and have operating parameters including a minimum pulsewidth and an associated minimum controllable fuel flow rate, and a maximum fuel flow rate. An exhaust gas recirculation (EGR) system includes a flow channel for directing flow of externally recirculated exhaust gas between the exhaust manifold 58 and the intake manifold 56, an intercooler 57 and an EGR valve 32 that is controlled via control signal 33 from the control module 5. An intake air compressor system 38 is configured to control flow of intake air to the CI engine 10 in response to a compressor boost command 39. The intake air compressor system 38 boosts a supply of intake air into the CI engine 10 to increase engine mass airflow and thus increase engine power, including increasing intake air pressure to greater than ambient pressure. In one embodiment the intake air compressor system 38 is a variable-geometry turbocharger (VGT) system that includes a turbine device located in the exhaust gas feedstream rotatably coupled to a compressor device that is configured to increase flow of engine intake air. Alternatively, the intake air compressor system 38 may include a supercharger device or another turbocharger device. An air intercooler device 16 may be fluidly located between the intake air compressor 38 and the engine intake manifold 56. An electronically-controlled throttle valve 14 controls throttle opening and thus flow of intake air into the intake system of the CI engine 10 in response to a throttle control signal (ETC) 15. A glow-plug may be installed in each of the combustion chambers 34 for increasing in-cylinder temperature during engine starting events at cold ambient temperatures. The CI engine 10 may be equipped with a controllable valvetrain configured to adjust openings and closings of the intake and exhaust valves of each of the cylinders, including any one or more of valve timing, phasing (i.e., timing relative to crank angle and piston position), and magnitude of lift of valve openings.

The sensors described herein are configured to monitor physical characteristics and generate signals that correlate to engine, exhaust gas, and ambient parameters. A crank sensor interacts with a multi-tooth target wheel attached to the crankshaft to monitor engine crank position and engine speed (RPM) 25. A combustion pressure sensor 30 is configured to monitor cylinder pressure 31, from which a mean-effective pressure or another suitable combustion parameter may be determined. The combustion pressure sensor 30 may be non-intrusive, including a force transducer having an annular cross-section that is installed into the cylinder head at an opening for a glow-plug and having an output signal that is proportional to cylinder pressure. The pressure sensor 30 includes a piezo-ceramic or other suitable monitoring device. A mass air flow (MAF) sensor 18 monitors mass air flow 19 of fresh intake air. A coolant sensor 36 monitors engine coolant temperature 35. A manifold absolute pressure (MAP) sensor 26 monitors intake manifold absolute pressure 27 and ambient barometric pressure. A manifold air temperature (MAT) sensor 28 monitors intake manifold air temperature 29. Exhaust gas sensors 40 and 42 monitor states 41 and 43 respectively, of one or more exhaust gas parameters, e.g., air/fuel ratio, and exhaust gas constituents, and may be used as feedback for control and diagnostics. Other sensors and monitoring schemes may be employed for purposes of control and diagnostics. Operator input in the form of an output torque request 55 may be obtained through an operator interface system 54 that preferably includes an accelerator pedal and a brake pedal, among other devices. Each of the aforementioned sensors is signally connected to the control module 5 to provide signal information which is transformed to information representative of the respective monitored parameter. It is understood that this configuration is illustrative, not restrictive, including the various sensors being replaceable with functionally equivalent devices and algorithms.

The control module 5 executes routines stored therein to control the aforementioned actuators to control engine operation, including throttle position, fuel injection mass and timing, EGR valve position to control flow of recirculated exhaust gases, compressor boost, glow-plug operation, and control of intake and/or exhaust valve timing, phasing, and lift on systems so equipped. The control module 5 is configured to receive the operator inputs (e.g., a throttle pedal position and a brake pedal position) to determine the output torque request 55 and receive signal inputs from the sensors indicating engine operation and ambient conditions. The CI engine 10 is configured to generate output torque in response to the output torque request 55, including operating over a broad range of temperatures, cylinder charge (air, fuel, and EGR) and injection events. Operation of the CI engine 10 is described at an operating point, which is characterized in terms of engine speed (RPM) and engine load. The engine load is indicated by the injector control signal 13 in response to the output torque request.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module 5 has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

Figure 2:
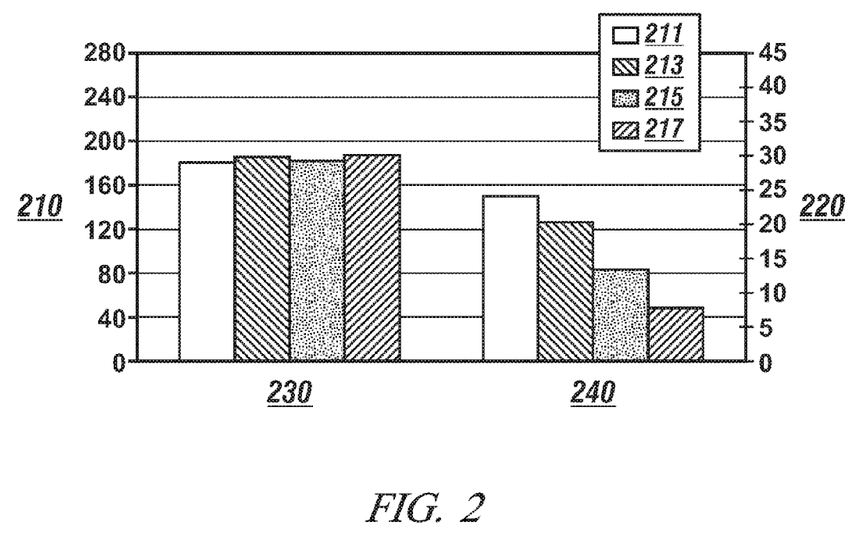
FIG. 2 illustrates exhaust emissions data associated with operating an exemplary CI engine using a known driving cycle and combusting fuel including different biodiesel blend ratios, with the emissions data including NOx emissions (mg/km) and particulate matter (PM) (mg/km), in accordance with the disclosure.

FIG. 2 graphically shows exhaust emissions data associated with operating an exemplary CI engine using a known driving cycle and combusting fuel including different biodiesel blend ratios, with the emissions data including NOx emissions (mg/km) 210 and particulate matter (PM) (mg/km) 220. The data reflects operation under a transient NEDC driving cycle. The NOx emissions (mg/km) (210) and particulate matter (PM) (mg/km) 220 is shown for diesel fuel (0% BV fuel) 211 and biodiesel blend ratios including 20% BV fuel 213, i.e., diesel fuel that contains 20% biodiesel fuel, 50% BV fuel 215, i.e., diesel fuel that contains 50% biodiesel fuel, and 100% BV fuel 217, i.e., diesel fuel that contains only biodiesel fuel. The results indicate that the addition of biodiesel fuel has a de minimis effect upon NOx emissions. The results also indicate that the addition of biodiesel fuel causes a corresponding decrease in PM.

Figure 31:
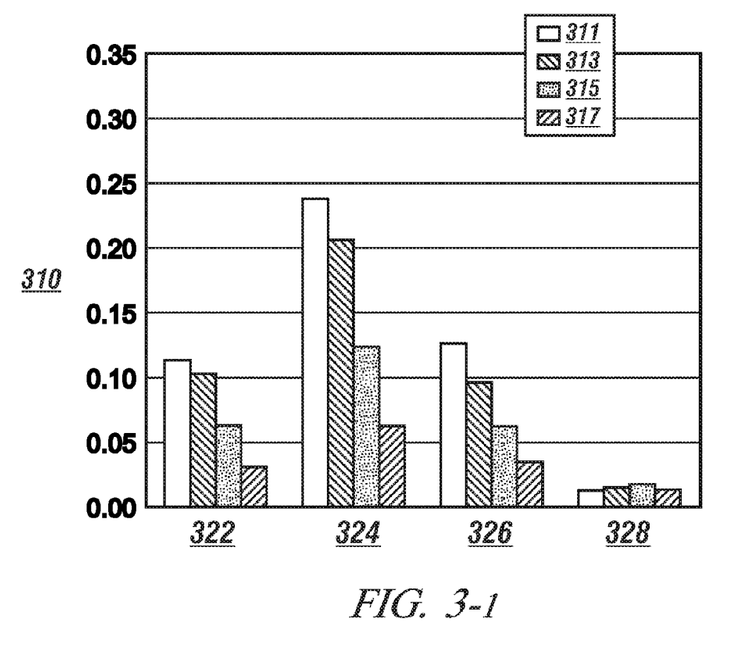

FIG. 3 graphically shows exhaust emissions data associated with operating an exemplary CI engine 10 to combust fuel including different biodiesel blend ratios at several engine operating points. The exhaust emissions data includes particulate matter (PM) (mg/km) shown on the vertical-axis 310 for diesel fuel (0% BV fuel) 211 and biodiesel blend ratios including 20% BV fuel 313, i.e., diesel fuel that contains 20% biodiesel fuel, 50% BV fuel 315, i.e., diesel fuel that contains 50% biodiesel fuel, and 100% BV fuel 317, i.e., diesel fuel that contains only biodiesel fuel. Results are shown for engine speed/load operating points including 1500 RPM, 2 bar (322), 2000 RPM, 5 bar (324), 2500 RPM, 8 bar (326), and 2500 RPM at full load (328). The results indicate that the addition of biodiesel fuel causes a corresponding decrease in PM generation, except at a maximum load curve when there is a minimal amount of PM generation. Thus PM generation is inversely linearly related to the biodiesel blend ratio due to the oxygen content in biodiesel, i.e., as the biodiesel blend ratio increases, PM generation decreases.

Figure 32:
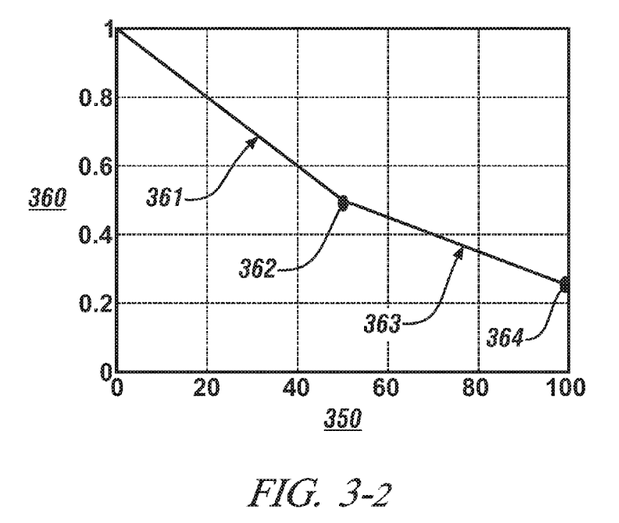

A PM generation scaling factor can be determined for PM generation in relation to the biodiesel blend ratio as follows. PM generation for diesel fuel (0% BV fuel) and is given a PM generation scaling factor of 1.0. PM generation at high load is substantially the same for biodiesel blend ratios over the range from 0% BV fuel to 100% BV fuel, as demonstrated in FIG. 3 by the results for the engine operating point of 2500 RPM at full load (328), and thus is knowable. Data can be generated for engine operation at 50% BV fuel to determine PM generation and thus an associated PM generation scaling factor for the 50% BV fuel. FIG. 3-2 graphically shows exemplary data for derivation of the PM generation scaling factor, including a vertical-axis 360 showing the PM generation scaling factor ranging between 0 and 1 and a horizontal-axis 350 showing the biodiesel blend ratio ranging from diesel fuel (0% BV fuel) to 100% BV fuel. Point 362 is the PM generation scaling factor for the 50% BV fuel and point 364 is the PM generation scaling factor for the 100% BV fuel. Line segment 361 depicts a linear estimate of the PM generation between 0% BV fuel and 50% BV fuel. Line segment 363 depicts a linear estimate of the PM generation between 50% BV fuel and 100% BV fuel. A calibration table can be developed that uses linear interpolation to determine the PM generation scaling factor for the biodiesel blend ratio over the range from diesel fuel (0% BV fuel) to 100% BV, wherein $C_{BXX}$ is the PM generation scaling factor for fuel having a biodiesel blend ratio of xx % BV. Thus, the PM generation scaling factor $C_{BXX}$ may be defined in accordance with the following relationships.

$$C_{BXX} = \begin{cases} 1 - \dfrac{1 - C_{B50}}{50} BV, & 0 < BV <= 50\% \\ 0.75 - \dfrac{C_{B50} - 0.25}{50} BV, & 50\% < BV < 100\% \\ 1, & 0\% < BV < 100\%, \text{ full load} \end{cases} \quad [1]$$

Figure 4:
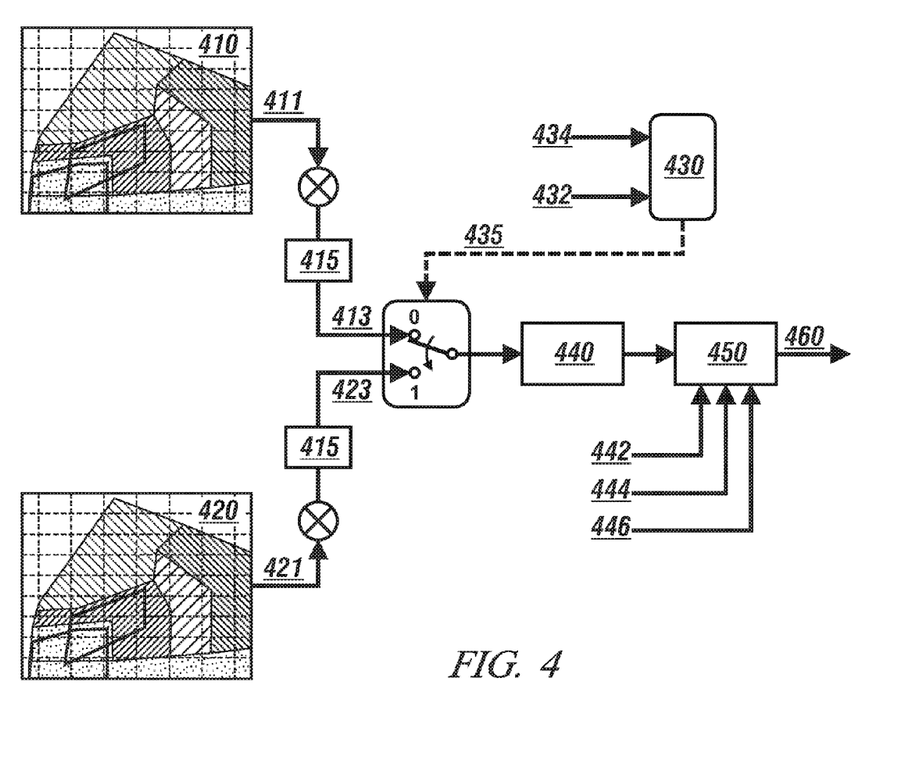
FIG. 4 illustrates a control scheme for determining PM loading on a particulate filter device of an exhaust aftertreatment system for an exemplary CI engine that accounts for variations in the biodiesel blend ratio, in accordance with the disclosure.

The PM generation scaling factor $C_{BXX}$ is applied to the nominal PM loading rate as described herein with regard to FIG. 4.

FIG. 4 schematically shows a control scheme 400 for determining PM loading on a particulate filter device of an exhaust aftertreatment system for an embodiment of the CI engine 10 during ongoing operation. The control scheme 400 accounts for the biodiesel blend ratio including variations thereof in determining the PM loading. Nominal PM loading rate maps are shown for engine operating speed/load ranges under steady-state conditions 410 and under high dynamic acceleration conditions 420 with the CI engine operating using diesel fuel (0% BV fuel). The PM loading rate maps for engine operating speed/load ranges under steady-state conditions are graphically depicted with a first map 410, which preferably includes a plurality of PM loading rates (g/h) that are shown in relation to engine speed/load operating points, with engine speed shown on the horizontal-axis and engine load shown on the vertical-axis of the first map 410. The PM loading rate maps for engine operating speed/load ranges under high dynamic acceleration conditions are graphically depicted with a second map 420, which preferably includes PM loading rates (g/h) in relation to engine speed/load operating points with engine speed shown on the horizontal-axis and engine load shown on the vertical-axis of the second map 420. There may be a plurality of PM loading rate maps for engine operating speed/load ranges under high dynamic acceleration conditions, each associated with a present gear ratio of the transmission. A first PM loading rate (g/h) 411 is selected from the first map 410 indicating PM loading rate under steady-state conditions. A second PM loading rate (g/h) 421 is selected from the second map 420 indicating PM loading rate under high dynamic acceleration conditions. Each of the first and second PM loading rates 411 and 421 is multiplied by the aforementioned PM generation scaling factor 415 to generate first and second adjusted PM loading rates (g/h) 413 and 423. One of the first and second adjusted PM loading rates 413 and 423 is selected (440) based upon a selection scheme 430. The selection scheme 430 generates a preferred selection 435 of one of the first and second adjusted PM loading rates 413 and 423 in response to the engine operating point as indicated by a fuel injection quantity 432 and a PM or smoke quantity limitation 434, which is based upon an air/fuel ratio limit, which affects how fast engine speed can accelerate without enough air. The fuel injection quantity 432 corresponds to the injector control signal 13 generated in response to the output torque request that has been previously described. The first adjusted PM loading rate (g/h) 413 is selected when the fuel injection quantity 432 and the smoke quantity limitation 434 indicate that the CI engine 10 is operating under steady-state conditions. The second adjusted PM loading rate (g/h) 423 is selected when the fuel injection quantity 432 and the smoke quantity limitation 434 indicate that the CI engine 10 is operating under high dynamic acceleration conditions.

The selected adjusted PM loading rate (g/h) is integrated over elapsed time (440). Other PM loading factors of interest, including a contribution from oil ash (1) (442), a particulate filter capacity (1) (444), and a maximum PM loading density for the particulate filter (g/l) (446) are employed in a PM loading normalization scheme (450). The PM loading normalization scheme (450) determines an estimate of the particulate filter PM loading (%) based upon the aforementioned inputs (460). The particulate filter PM loading (%) (460) is employed to determine when to execute a control scheme to regenerate the particulate filter by oxidizing the trapped PM. The control scheme 400 determines the PM loading on the particulate filter device during ongoing operation and accounts for the biodiesel blend ratio. Thus, as the biodiesel blend ratio increases, the PM loading on the particulate filter decreases, which allows extended operation between regeneration events as compared to diesel fuel (0% BV fuel).

Figure 5:
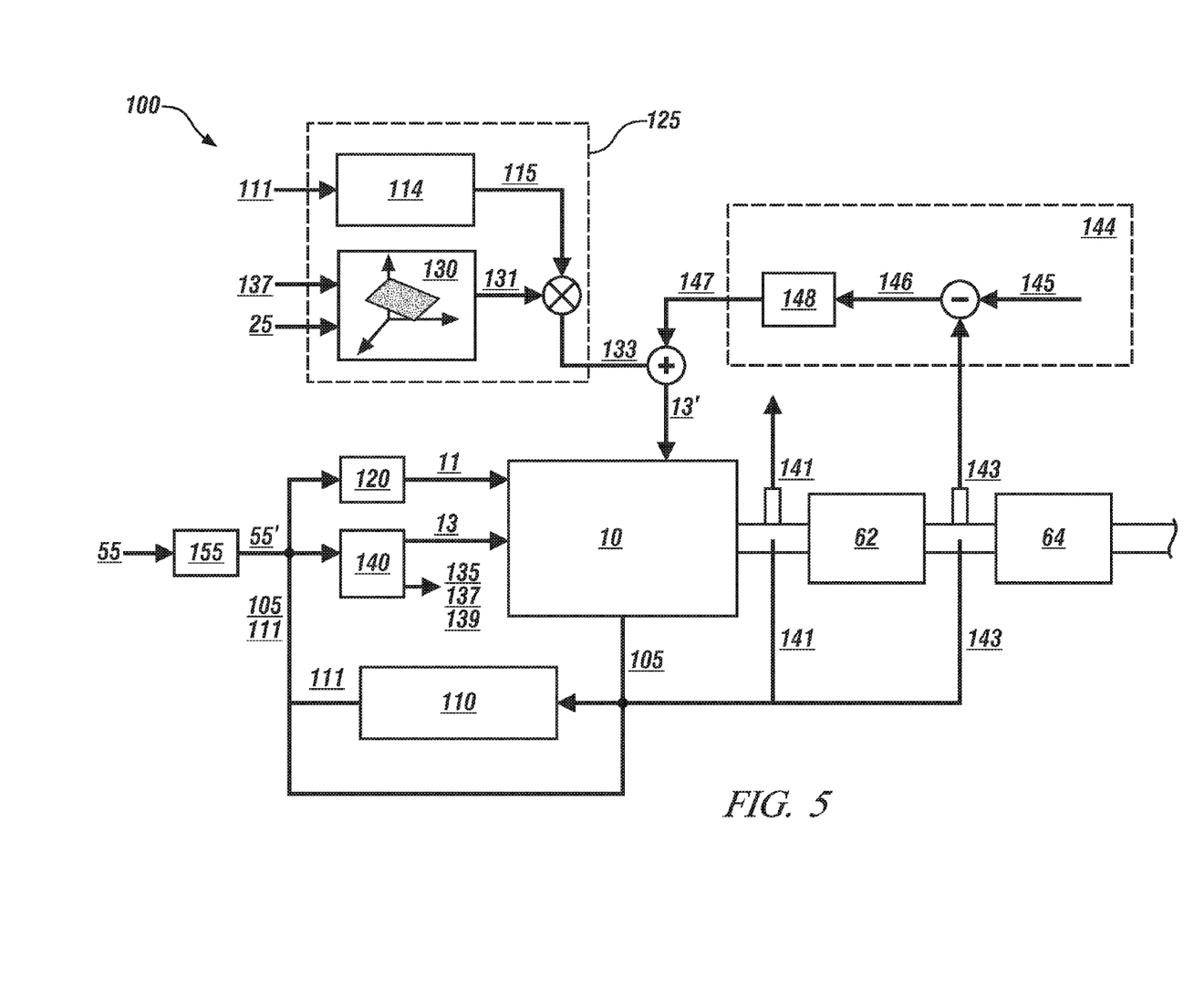
FIG. 5 illustrates an embodiment of an adaptive particulate filter regeneration scheme for controlling operation of a CI engine combusting a biodiesel fuel blend to regenerate a particulate filter of an exhaust aftertreatment system, in accordance with the disclosure.

FIG. 5 schematically shows an embodiment of an adaptive particulate filter regeneration scheme 100 for controlling operation of an exemplary CI engine equipped with an exhaust aftertreatment system including an oxidation catalyst and particulate filter. The adaptive particulate filter regeneration scheme 100 operates to regenerate the particulate filter in a configuration wherein the CI engine 10 combusts fuel that may include a biodiesel fuel blend. The adaptive particulate filter regeneration scheme 100 may be employed on an embodiment of the CI engine 10 and exhaust aftertreatment system 60 described with reference to FIG. 1. The adaptive particulate filter regeneration scheme 100 is responsive to the biodiesel fuel blend, wherein the magnitude of the biodiesel blend ratio of the engine fuel may vary during operation and during the service life of the CI engine 10. The biodiesel blend ratio affects the lower heating value and stoichiometric air/fuel ratio of the engine fuel.

During engine operation, an engine torque determination scheme 155 analyzes the output torque request 55 to determine an engine torque request 55'. When the powertrain system includes the CI engine 10 coupled to a fixed-gear transmission device, the engine torque request 55' is equal to the output torque request 55. When the powertrain system includes a hybrid powertrain system that employs the CI engine 10 as one of a plurality of torque-generative devices that generate tractive torque in response to the output torque request 55, the engine torque request 55' may differ from the output torque request 55. Determining the engine torque request 55' in response to the output torque request 55 for a hybrid powertrain system is known to skilled practitioners.

The engine operating parameters 105 are monitored. A blend ratio subroutine 110 is executed to determine a magnitude of the biodiesel blend ratio 111 during ongoing engine operation using suitable monitoring and analytical schemes. A first exemplary method to determine a biodiesel blend ratio based upon an exhaust oxygen fraction and an air/fuel ratio is disclosed in co-pending and commonly assigned U.S. Ser. No. 13/113,177, which is incorporated herein by reference. A second exemplary method to determine the biodiesel blend ratio based upon an in-cylinder pressure is disclosed in co-pending and commonly assigned U.S. Ser. No. 12/850,122, which is incorporated herein by reference. The blend ratio subroutine 110 is preferably periodically executed during ongoing engine operation to determine the biodiesel blend ratio 111. By directly determining the biodiesel blend ratio, properties of the engine fuel can be estimated or determined from look-up values. The biodiesel blend ratio 111 may be calculated as a volumetric blend ratio or another suitable ratio.

An adaptive engine control routine 120 employs the engine operating parameters 105, the biodiesel blend ratio 111 and the engine torque request 55' to determine a plurality of control parameters 11 for operating the CI engine 10 in response thereto. This preferably includes controlling engine combustion in response to a lower heating value and stoichiometric air/fuel ratio of the engine fuel taking into account the biodiesel blend ratio 111. The adaptive engine control routine 120 adjusts contents of a cylinder charge and manages compressor boost to account for changes in energy and oxygen content of the biodiesel fuel blend. This includes employing a plurality of adaptive control algorithms to adapt boost pressure, rail pressure, EGR % and MAF control to maintain engine torque output, engine and combustion noise, and exhaust emissions level.

An engine fueling control scheme 140 employs the engine operating parameters 105, the biodiesel blend ratio 111 and the engine torque request 55' to determine and generate outputs including fuel parameters 135 associated with the biodiesel blend ratio 111, a base fueling command 137 and an adjusted fueling command 139. The base fueling command 137 is an engine fueling command that is determined based upon an amount of diesel fuel (0% BV fuel) required to generate engine torque to meet the engine torque request 55'. The base fueling command 137 is adjusted to the adjusted fueling command 139 based upon a lower heating value of the fuel blend, wherein the lower heating value of the fuel blend is determined based upon the biodiesel blend ratio 111. The engine fuel control scheme 140 employs the adjusted fueling command 139 to determine the injector command 13 including fuel injection timing and pulsewidth commands to deliver a mass of fuel into the combustion chamber 34 in response to the engine torque request 55', taking into account fuel pressure, the aforementioned fuel parameters 135, and the various engine operating parameters 105. As previously stated, the base fueling command 137 is adjusted to the adjusted fueling command 139 based upon the lower heating value of the biodiesel fuel blend, wherein the lower heating value of the biodiesel fuel blend is determined based upon the biodiesel blend ratio 111.

The particulate filter 64 requires periodic regeneration to oxidize and thus purge trapped particulate matter (PM), which may be effected by increasing the temperature of the exhaust gas feedstream entering the particulate filter 64 to a temperature that is suitable for oxidizing trapped PM. The exhaust gas feedstream temperature entering the particulate filter 64 may be increased by injecting fuel into the exhaust gas feedstream for oxidation in the oxidation catalyst 62. In one embodiment fuel is injected into the exhaust gas feedstream by controlling the engine fuel injectors 12 to inject engine fuel into the combustion chambers 34 post-combustion, e.g., at the end of the power stroke or during the exhaust stroke when the exhaust valve is open. Alternatively, an exhaust injection system may be employed to inject fuel into the exhaust gas feedstream upstream of the oxidation catalyst 62.

The adaptive particulate filter regeneration scheme 100 employs a feed-forward control scheme 125 based upon the biodiesel blend ratio 111 and a feedback control scheme 144 based upon exhaust gas temperature to determine a post-combustion fuel command 13'. The feed-forward control scheme 125 executes as follows. When regeneration of the particulate filter is commanded, the base fueling command 137 and the present engine speed 25 are used to determine a nominal post-combustion fuel amount 131 using a post-combustion fuel injection calibration table 130. The nominal post-combustion fuel amount 131 is adjusted to account for a fuel heating content 115 of the biodiesel blend ratio 111. A biodiesel blend ratio-adjusted post-combustion fuel amount 133 is determined and is output from the feed-forward control scheme 125. The post-combustion fuel injection calibration table 130 is developed for the CI engine 10 and exhaust aftertreatment system 60 when operating with diesel fuel (0% BV fuel). The post-combustion fuel injection calibration table 130 reflects an amount of post-combustion fuel to be injected into the exhaust gas feedstream to achieve a preferred temperature in the exhaust gas feedstream at the outlet of the oxidation catalyst 62 and thus the inlet to the particulate filter 64 that is suitable for effecting regeneration of the particulate filter 64. The post-combustion fuel injection calibration table 130 provides the nominal post-combustion fuel amount 131 based upon the engine speed/load operating point as indicated by the base fueling command 137 and the engine speed (RPM) 25.

Subroutine 114 uses the biodiesel blend ratio 111 to calculate the fuel heating content 115 in accordance with the following relationship:

$$\text{Fuel heating content } 115 = \frac{\eta_{RD} LHV_{RD}}{\alpha \cdot \eta_{BD} LHV_{BD}} \quad [2]$$

wherein
- $\eta_{BD}$ is the thermal efficiency of the oxidation catalyst employing the biodiesel fuel blend;
- $\eta_{RD}$ is the thermal efficiency of the oxidation catalyst with diesel fuel (0% BV fuel);
- $LHV_{BD}$ is the lower heating value of the biodiesel fuel blend;
- $LHV_{RD}$ is the lower heating value of the diesel fuel (0% BV fuel); and
- $\alpha$ is a calibration term.

And the calibration term a in the relationship [2] above is defined in the following relationship.

$$\alpha = \frac{T_{outRD} - T_{in}}{T_{outBD} - T_{in}} \quad [3]$$

wherein
- $T_{in}$ is the temperature of the exhaust gas feedstream at the inlet of the oxidation catalyst;
- $T_{outRD}$ is the temperature of the exhaust gas feedstream at the outlet of the oxidation catalyst using diesel fuel (0% BV fuel); and
- $T_{outBD}$ is the temperature of the exhaust gas feedstream at the outlet of the oxidation catalyst using the biodiesel fuel blend.

Thus, the nominal post-combustion fuel injection amount ($m_{post2RD}$) 131 is multiplied by the fuel heating content 115 to determine the biodiesel blend ratio-adjusted post-combustion fuel amount ($m_{post2BD}$) 133 in accordance with the following relationship.

$$m_{post2BD} = \frac{\eta_{RD} LHV_{RD}}{\alpha \cdot \eta_{BD} LHV_{BD}} m_{post2RD} \quad [4]$$

The feedback control scheme 144 determines a feedback post-combustion fuel injection amount 147 based upon exhaust gas temperature. The actual temperature 143 of the exhaust gas feedstream at the outlet of the oxidation catalyst, which may be measured or estimated, is compared with a reference outlet temperature 145 at the outlet of the oxidation catalyst to calculate a temperature difference 146, which is input to a PID controller 148. The PID controller 148 generates the feedback post-combustion fuel injection amount 147 based upon the temperature difference 146. The feedback post-combustion fuel injection amount 147 is added to the biodiesel blend ratio-adjusted post-combustion fuel amount $m_{post2BD}$ 133 to determine a post-combustion injector command 13'. The post-combustion injector command 13' executes during each regeneration event to command injection of an amount of fuel to increase the temperature of the exhaust gas feedstream upstream of the particulate filter 64 to effect regeneration thereof. The fuel amount is preferably a mass amount of fuel or a mass flowrate of fuel that may be achieved by controlling an injector pulsewidth that includes information about fuel pressure and volumetric flowrates.

Figure 6:
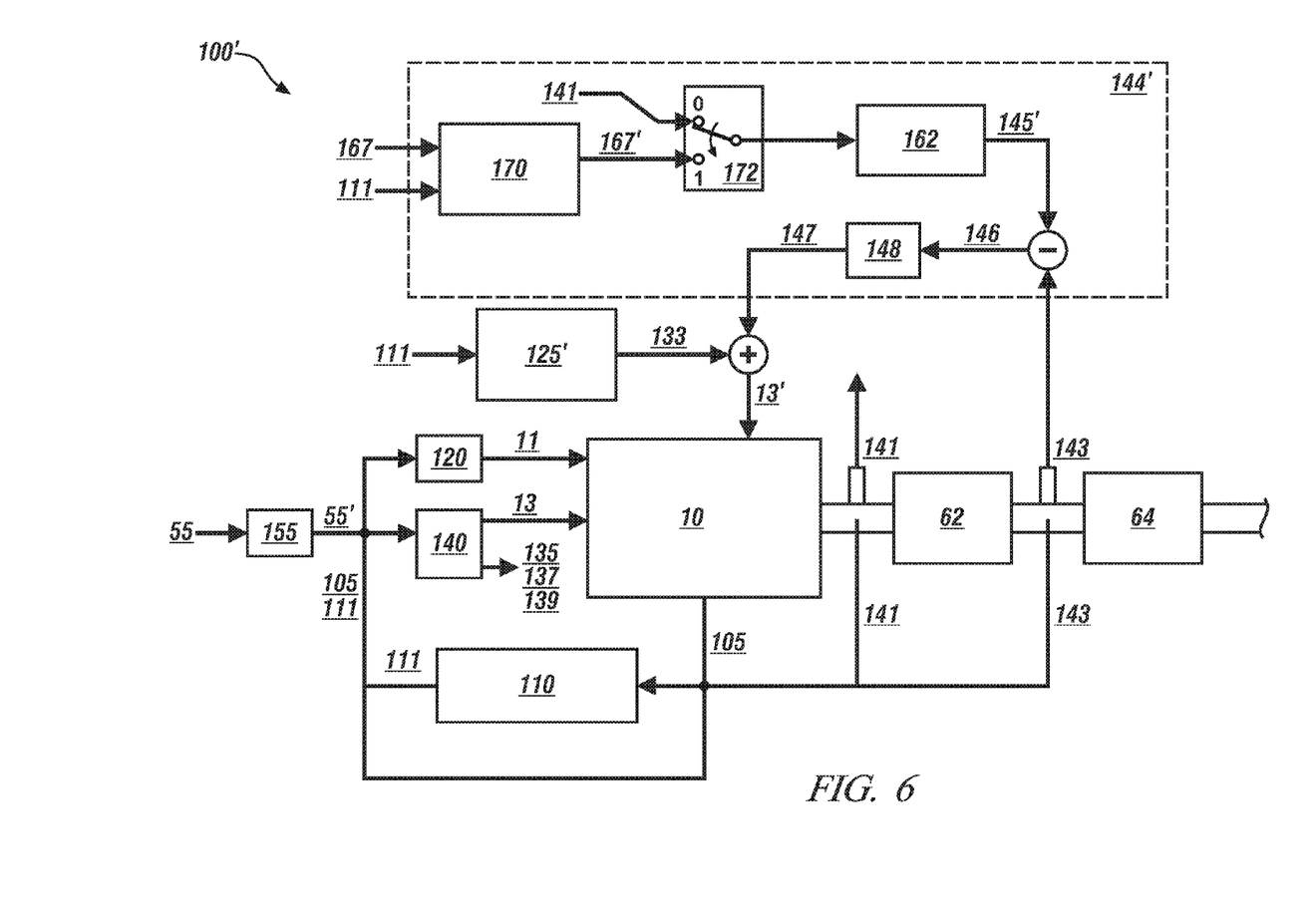
FIG. 6 illustrates another embodiment of an adaptive particulate filter regeneration scheme for controlling operation of a CI engine combusting a biodiesel fuel blend to regenerate a particulate filter of an exhaust aftertreatment system, in accordance with the disclosure.

FIG. 6 schematically shows another embodiment of an adaptive particulate filter regeneration scheme 100' for controlling operation of an exemplary CI engine equipped with an exhaust aftertreatment system including an oxidation catalyst and particulate filter. The adaptive particulate filter regeneration scheme 100' operates to regenerate the particulate filter in a configuration wherein the CI engine 10 combusts fuel that may include a biodiesel fuel blend. The adaptive particulate filter regeneration scheme 100' may be employed on an embodiment of the CI engine 10 and exhaust aftertreatment system 60 described with reference to FIG. 1. The adaptive particulate filter regeneration scheme 100' is responsive to the biodiesel fuel blend, wherein the magnitude of the biodiesel blend ratio of the engine fuel may vary during operation and during the service life of the CI engine 10. The biodiesel blend ratio affects the lower heating value and stoichiometric air/fuel ratio of the engine fuel.

Feed-forward control scheme 125' monitors the biodiesel blend ratio 111 and determines the biodiesel blend ratio-adjusted post-combustion fuel amount 133 in accordance with the following relationship.

$$\dot{m}_{exPost2BD} = \frac{\dot{m}_{ex} * c_p (T_{out\_ref\_fil} - T_{in})}{\eta(\dot{m}_{ex}, BV, \lambda) * LHV_{BD}} \quad [5]$$

wherein
- $T_{out\_ref\_fil}$ is the filtered reference temperature of the exhaust gas feedstream at the outlet of the oxidation catalyst, i.e., upstream of the particulate filter;
- $T_{in}$ is the temperature of the exhaust gas feedstream at the inlet of the oxidation catalyst;
- $\eta$ is the thermal efficiency of the oxidation catalyst;
- $\dot{m}_{ex}$ is the exhaust gas flowrate;
- BV is the biodiesel blend ratio of the fuel;
- $\lambda$ is the stoichiometric air/fuel ratio of the fuel;
- LHV is the lower heating value of the fuel;
- $m_{post2}$ is the amount of post-combustion fuel that is injected; and
- $c_p$ is the specific heat of the fuel.

Feedback control scheme 144' determines the feedback post-combustion fuel injection amount 147 based upon exhaust gas temperature as follows. A correction scheme 170 adjusts a reference temperature 167 in relation to the biodiesel blend ratio 111 to determine a blend ratio-corrected reference temperature 167'. A selector block 172 operates to select one of the blend ratio-corrected reference temperature 167' and the inlet temperature 141 of the oxidation catalyst 62. When no regeneration event is commanded (172)(0), the inlet temperature 141 of the oxidation catalyst 62 is selected, and thus the feedback post-combustion fuel injection amount 147 is zero, as there is no calculated difference between the inlet temperature 141 and the outlet temperature 143 of the oxidation catalyst 62. The outlet temperature 143 of the oxidation catalyst 62 may be measured or estimated using suitable methods.

When a regeneration event is commanded (172)(1), the feedback post-combustion fuel injection amount 147 is determined as follows. The blend ratio-corrected reference temperature 167' is input to a transfer function 162 to determine a modified reference outlet temperature 145'. In one embodiment, the transfer function 162 is a first-order lag filter that acts upon the reference temperature of the exhaust gas feedstream at the inlet of the oxidation catalyst to determine the temperature of the exhaust gas feedstream upstream of the particulate filter in accordance with the following relationship.

$$T_{out\_ref\_fil} = T_{ref} \frac{1}{\tau(\dot{m}_{ex})s + 1} \quad [6]$$

wherein $T_{out\_ref\_fil}$ is the filtered reference temperature 145' of the exhaust gas feedstream at the outlet of the oxidation catalyst, i.e., upstream of the particulate filter 64;

$T_{in}$ is the temperature of the exhaust gas feedstream at the inlet of the oxidation catalyst 62, i.e., one of the blend ratio-corrected reference temperature 167' and the inlet temperature 141 of the oxidation catalyst 62; and $\dot{m}_{ex}$ is the exhaust gas flowrate.

The lag filter function of the transfer function 162 introduces a time lag in the transition from change in temperature from the inlet temperature 141 of the oxidation catalyst 62 to the blend ratio-corrected reference temperature 167' to prevent overfueling of the post-combustion injection due to thermal lag associated with warm-up of the oxidation catalyst 62.

The filtered temperature of the exhaust gas feedstream at the outlet of the oxidation catalyst 145' is arithmetically compared with the outlet temperature 143 of the oxidation catalyst 62 to determine a temperature difference 146. The temperature difference 146 is input to the PID controller 148, which generates the feedback post-combustion fuel injection amount 147 based upon the temperature difference 146. The feedback post-combustion fuel injection amount 147 is added to the biodiesel blend ratio-adjusted post-combustion fuel amount $m_{post2BD}$ 133 to determine the post-combustion injector command 13'. The post-combustion injector command 13' is executed during each regeneration event to command injection of an amount of fuel to increase the temperature of the exhaust gas feedstream upstream of the particulate filter 64 to effect regeneration thereof.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a compression-ignition engine coupled to an exhaust aftertreatment system including a particulate filter, comprising:
   executing a feed-forward control scheme to determine an amount of post-combustion fuel to achieve a preferred temperature for regenerating the particulate filter in the exhaust gas feedstream at an inlet to the particulate filter, the amount of post-combustion fuel comprising a nominal post-combustion fuel amount adjusted for a biodiesel blend ratio of the fuel, wherein executing said feed-forward control scheme comprises:
   determining the nominal post-combustion fuel amount based upon an amount of post-combustion fuel corresponding to an engine operating point to achieve the preferred temperature in the exhaust gas feedstream at the inlet to the particulate filter when the post-combustion fuel comprises diesel fuel, comprising:
   determining the biodiesel blend ratio of the fuel;
   determining a lower heating value for the biodiesel blend ratio of the fuel; and
   adjusting the nominal post-combustion fuel amount based upon the lower heating value for the biodiesel blend ratio of the fuel in accordance with a relationship as follows:

$$\dot{m}_{exPost2BD} = \frac{\dot{m}_{ex} * c_p (T_{out\_ref\_fil} - T_{in})}{\eta(\dot{m}_{ex}, BV, \lambda) * LHV_{BD}}$$

wherein $T_{out\_ref\_fil}$ is a temperature of the exhaust gas feedstream upstream of the particulate filter, $T_{in}$ is a temperature of the exhaust gas feedstream at an inlet of an oxidation catalyst upstream of the particulate filter, $\eta$ is thermal efficiency of the oxidation catalyst, $\dot{m}_{ex}$ is exhaust gas flowrate, BV is a biodiesel blend ratio of the fuel, $\lambda$ is a stoichiometric air/fuel ratio of the fuel, $LHV_{BD}$ is a lower heating value of the fuel, $\dot{m}_{exPost2BD}$ is the amount of fuel that is injected post-combustion, and $c_p$ is the specific heat of the fuel; and injecting the post-combustion fuel upstream of the exhaust aftertreatment system in response to a command to regenerate the particulate filter.

2. The method of claim 1, wherein injecting the post-combustion fuel upstream of the exhaust aftertreatment system comprises controlling an engine fuel injector to execute a post-combustion fuel injection event to inject the post-combustion fuel in the exhaust gas feedstream upstream of the exhaust aftertreatment system.

3. The method of claim 1, wherein injecting the post-combustion fuel in the exhaust gas feedstream upstream of the exhaust aftertreatment system comprises controlling an engine fuel injector to execute a post-combustion fuel injection event to inject the post-combustion fuel in the exhaust gas feedstream upstream of an oxidation catalyst of the exhaust aftertreatment system.

4. The method of claim 1, further comprising executing a feedback control scheme to adjust the amount of post-combustion fuel based on a difference between an inlet temperature to the particulate filter and a reference inlet temperature.

5. The method of claim 4 wherein the reference inlet temperature is determined by applying a transfer function to a blend ratio-corrected reference temperature to determine a modified reference outlet temperature at an outlet of an oxidation catalyst upstream of the particulate filter.

6. The method of claim 5, wherein applying the transfer function to the blend ratio-corrected reference temperature comprises applying a first-order lag filter to the blend ratio-corrected reference temperature to determine the modified reference outlet temperature.

7. Method for operating a compression-ignition engine coupled to an exhaust aftertreatment system including an oxidation catalyst upstream of a particulate filter comprising:
determining particulate matter loading on the particulate filter by integrating a rate of particulate matter production corresponding to a biodiesel blend ratio of fuel; and
in response to a command to regenerate the particulate filter, injecting fuel into an exhaust gas feedstream upstream of the oxidation catalyst, including executing a feed-forward control scheme to determine the amount of fuel injected into the exhaust gas feedstream correlated to a nominal post-combustion fuel injection amount that is adjusted based upon the biodiesel blend ratio of the fuel, comprising determining the nominal post-combustion fuel injection amount based upon an amount of post-combustion fuel associated with an engine operating point to achieve a preferred temperature for regenerating the particulate filter at an inlet to the particulate filter when the post-combustion fuel comprises diesel fuel;
wherein executing the feed-forward control scheme to determine the amount of fuel injected into the exhaust gas feedstream correlated to the nominal post-combustion fuel injection amount that is adjusted based upon the biodiesel blend ratio of the fuel comprises adjusting the nominal post-combustion fuel injection amount based upon a lower heating value for the biodiesel blend ratio of the fuel in accordance with a relationship as follows:

$$\dot{m}_{exPost2BD} = \frac{\dot{m}_{ex} * c_p (T_{out\_ref\_fil} - T_{in})}{\eta(\dot{m}_{ex}, BV, \lambda) * LHV_{BD}}$$

wherein
$T_{out\_ref\_fil}$ is a temperature of the exhaust gas feedstream upstream of the particulate filter,
$T_{in}$ is a temperature of the exhaust gas feedstream at an inlet of an oxidation catalyst upstream of the particulate filter,
$\eta$ is thermal efficiency of the oxidation catalyst,
$\dot{m}_{ex}$ is exhaust gas flowrate,
BV is a biodiesel blend ratio of the fuel,
$\lambda$ is a stoichiometric air/fuel ratio of the fuel,
$LHV_{BD}$ is a lower heating value of the fuel,
$\dot{m}_{exPost2BD}$ is the amount of fuel that is injected post-combustion, and
$c_p$ is the specific heat of the fuel.

8. The method of claim 7, wherein executing the feed-forward control scheme to determine the amount of fuel injected into the exhaust gas feedstream correlated to the nominal post-combustion fuel injection amount that is adjusted based upon the biodiesel blend ratio of the fuel comprises:
determining the nominal post-combustion fuel injection amount based upon an amount of post-combustion fuel associated with an engine operating point to achieve a preferred temperature of the exhaust gas feedstream at an inlet to the particulate filter when the post-combustion fuel comprises diesel fuel;
determining the biodiesel blend ratio of the fuel during ongoing operation; and
executing the feed-forward control scheme to determine the amount of post-combustion fuel to achieve the preferred temperature in the exhaust gas feedstream at the inlet to the particulate filter based upon a lower heating value for the biodiesel blend ratio.

9. The method of claim 7, further comprising executing a feedback control scheme to adjust said amount of fuel injected into the exhaust gas feedstream in relation to a difference between an inlet temperature to the particulate filter and a reference inlet temperature.

10. The method of claim 9, wherein the reference inlet temperature is determined by applying a first-order lag filter transfer function to a blend ratio-corrected reference temperature to determine a modified reference outlet temperature at an outlet of the oxidation catalyst.

* * * * *